United States Patent
Smith et al.

(10) Patent No.: US 7,743,387 B2
(45) Date of Patent: Jun. 22, 2010

(54) INHERITANCE CONTEXT FOR GRAPHICS PRIMITIVES

(75) Inventors: Adam M. Smith, Sammamish, WA (US); Jeffrey L. Bogdan, Bellevue, WA (US); Michael J. Hillberg, Beaux Arts, WA (US); Namita Gupta, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 1282 days.

(21) Appl. No.: 11/252,374

(22) Filed: Oct. 18, 2005

(65) Prior Publication Data
US 2007/0085853 A1    Apr. 19, 2007

(51) Int. Cl.
*G06F 13/00* (2006.01)

(52) U.S. Cl. .................. 719/316; 715/762; 707/102; 707/104.1

(58) Field of Classification Search .................. 719/316; 715/762; 707/102, 104.1
See application file for complete search history.

(56) References Cited

U.S. PATENT DOCUMENTS

| 6,269,475 | B1 * | 7/2001 | Farrell et al. ................. 717/113 |
| 7,571,389 | B2 * | 8/2009 | Broussard .................... 715/762 |
| 2005/0091637 | A1 | 4/2005 | Schechter et al. ........... 717/110 |

OTHER PUBLICATIONS

U.S. Appl. No. 10/992,462, filed Nov. 18, 2004, Nelson et al.

* cited by examiner

*Primary Examiner*—Andy Ho
(74) *Attorney, Agent, or Firm*—Merchant & Gould, P.C.

(57) ABSTRACT

An inheritance context is created for a graphics primitive object that is a property of a visual element. The inheritance context can be used to make some element information (e.g., information in resource dictionaries, name dictionaries, and inheritable properties that reside in the element tree containing the visual element) available to the graphics primitive object.

20 Claims, 6 Drawing Sheets

INHERITANCE CONTEXT FOR GRAPHICS PRIMITIVES

BACKGROUND

In some interactive systems, visual elements can be implemented in an interface. In some such systems, the visual elements are organized in a tree structure (i.e., an element tree). The various elements of the element tree can have properties and resources that can be "inherited" by other "child" elements of the element tree. Further, the visual elements may be implemented using graphics primitives such as brushes, pens, transforms, geometry and the like. For example, a button being displayed in a user interface (UI) can be implemented so that it has a specified background color. However, the graphics primitives are generally not linked to the element tree in a way that allows the graphics primitives to use the inheritance features of the element tree. This background information is not intended to identify problems that must be addressed by the claimed subject matter.

SUMMARY

This summary is provided to introduce a selection of concepts in a simplified form that are further described below in the Detail Description Section. This summary is not intended to identify key features or essential features of the claimed subject matter, nor is it intended to be used as an aid in determining the scope of the claimed subject matter.

According to aspects of various described embodiments, implementations are provided for creating an inheritance context for a graphics primitive object that is a property of a visual element. The inheritance context can advantageously make some element information (e.g., information in resource dictionaries, name dictionaries, and inheritable properties that reside in the element tree containing the visual element) available to the graphics primitive object.

Embodiments may be implemented as a computer process, a computer system (including mobile handheld computing devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following FIGS., wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Exemplary Operating Environment

Figure 1:
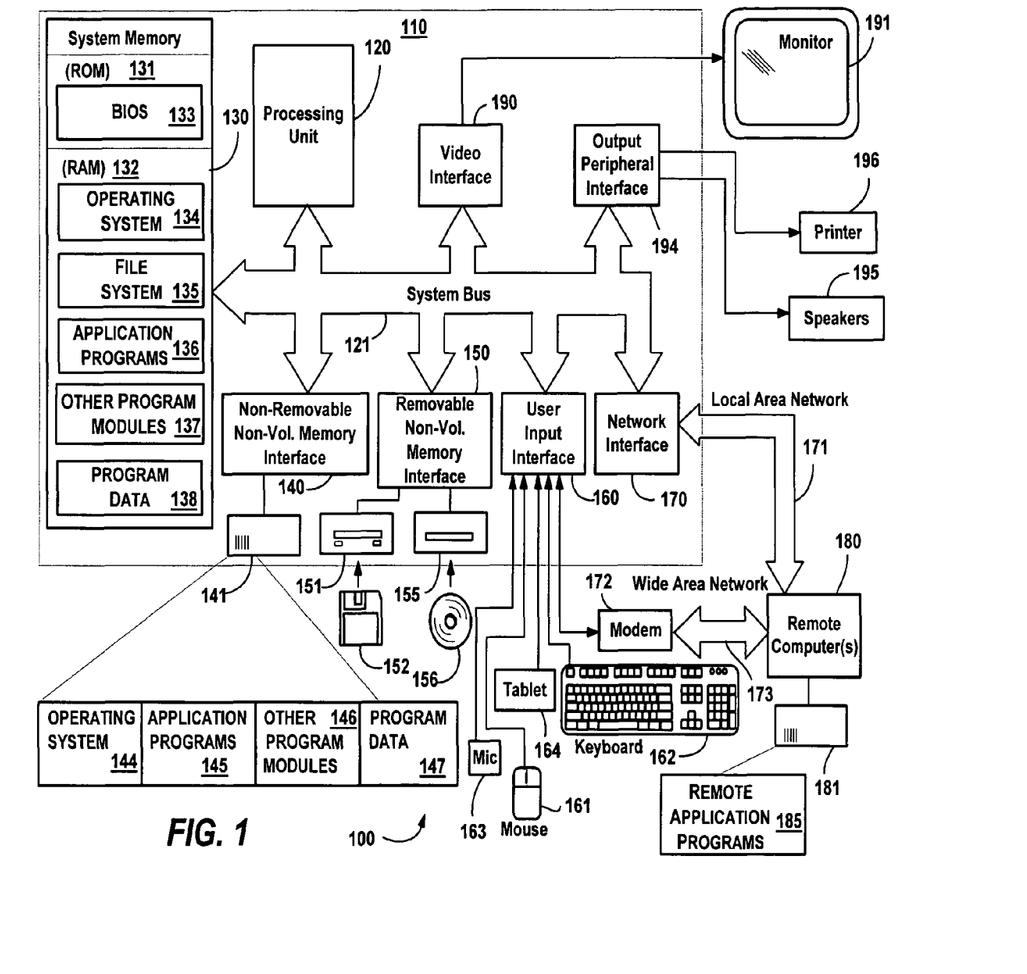
FIG. 1 is a block diagram representing an exemplary computer system into which the various embodiments may be incorporated.

FIG. 1 illustrates an example of a suitable computing system environment 100 on which various embodiments may be implemented. The computing system environment 100 is only one example of a suitable computing environment and is not intended to suggest any limitation as to the scope of use or functionality of the embodiments. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well known computing systems, environments, and/or configurations that may be suitable for use with the embodiments include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

Embodiments may be described in the general context of computer-executable instructions, such as program modules, being executed by a computer. Generally, program modules include routines, programs, objects, components, data structures, and so forth, which perform particular tasks or implement particular abstract data types. Embodiments may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Accelerated Graphics Port (AGP) bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Example Layered Architecture One aspect is generally directed towards providing smooth, complex animations and/or media on computer systems. To this end, as generally presented in FIG. 2, a media integration layer architecture 200 is provided. An application program, control or other similar higher-level program code (e.g., a user interface of an operating system component) 202 accesses the media integration layer architecture 200 via a set of application programming interfaces (APIs) 204 or the like, to access (write or read) graphical information. Note that although many of the examples described herein will refer to an application program interfacing with the APIs, it is understood that other higher-level program code and components (e.g., a user interface of the operating system) will also be able to interface with the lower-level components described herein. As such, any reference to such higher-level program code, whether referred to as an application program, user interface, and so on, should be considered equivalent.

Figure 2:
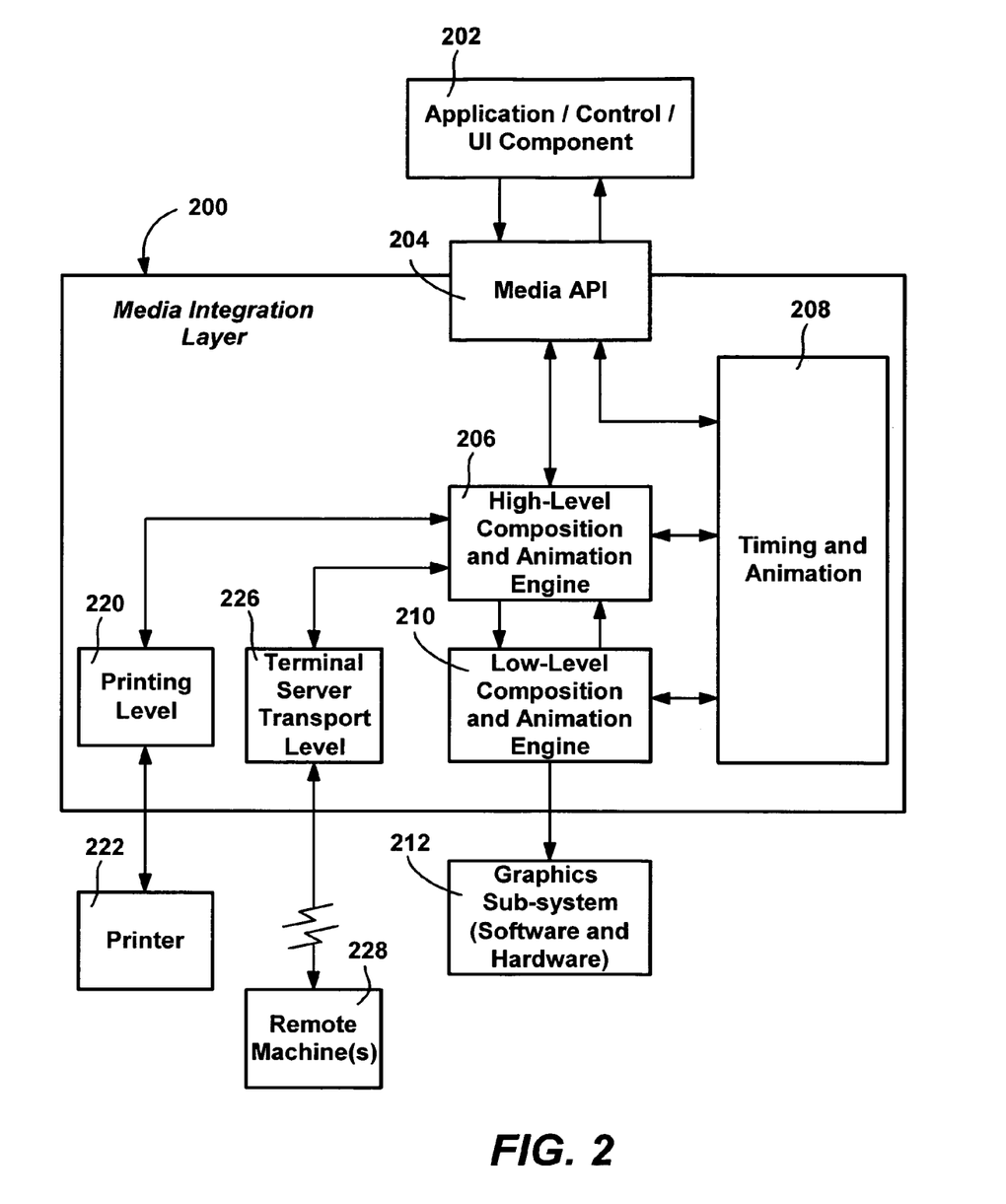
FIG. 2 is a block diagram representing a media integration layer architecture in accordance with an embodiment.

In one implementation, the media integration layer architecture 200 includes a high-level composition and animation engine 206, timing and animation components 208, and a low-level composition and animation engine 210. As used herein, the terms "high-level" and "low-level" are similar to those used in other computing scenarios, wherein in general, the lower a software component relative to higher components, the closer the component is to the hardware. Thus, for example, graphics information sent from the high-level composition and animation engine 206 may be received at the low-level compositing and animation engine 210, where the information is used to send graphics data to the graphics subsystem including the hardware.

In general, the high-level composition and animation engine (also referred to herein as the high-level compositor and animator or the high-level engine or component) 206 builds a display element tree to represent a graphics scene provided by the application program 202, while the timing and animation components provide declarative (or other) animation and timing control. The low-level compositing and animation engine (also referred to herein as the low-level compositor and animator or low-level engine or component) 210 composes the renderings for the scenes of multiple applications, and with rendering components, implements the actual rendering of graphics to the screen. Note, that it is still possible to do time-consuming or application-specific rendering at a higher levels, and pass references to a bitmap or the like to the lower layers.

The high-level composition and animation engine 206 builds the element tree structure and traverses the structure, creating rendering instructions and simple animation intervals to be passed to the low-level compositing and animation engine 210. The rendering instructions generated by the high-level compositor may contain timing and animation information. The low-level compositing and animation engine 210 takes the rendering instructions and animation intervals and manages the animating, rendering and composing the scene that is then provided to the graphics subsystem (e.g., the graphics software and hardware) 212. Alternatively or in addition to locally displayed output, the high-level composition and animation engine 206 (or one similar thereto) may provide the rendering and animation instructions in an appropriate format to lower-level printing code 220 for sending fixed image data to a printer 222 or the like, and/or may provide rendering instructions and simple animation intervals in an appropriate format to a lower-level terminal transport server 226 for transmission to remote machines 228. Note that richer information also may be passed across the network, e.g., it may be desirable to have the remote machine handle mouse rollover effects locally, without any network traffic.

In this implementation, the media integration layer architecture 200 thus separates graphics processing into multiple levels, and each of these levels performs some intelligent graphics processing which together allows applications' user interfaces and the like 202 to output graphics with smooth animation, composite the graphics with the graphics of other applications, and work with video frames. The animation and/or compositing may also be synchronized with audio output. For example, by synchronizing audio with the frame rate at the low-level component, the timing of audio can essentially be exact with that of video or graphics, and not dependent on the ability of task-scheduled, complex pre-processing to keep up with the refresh rate.

Figure 3:
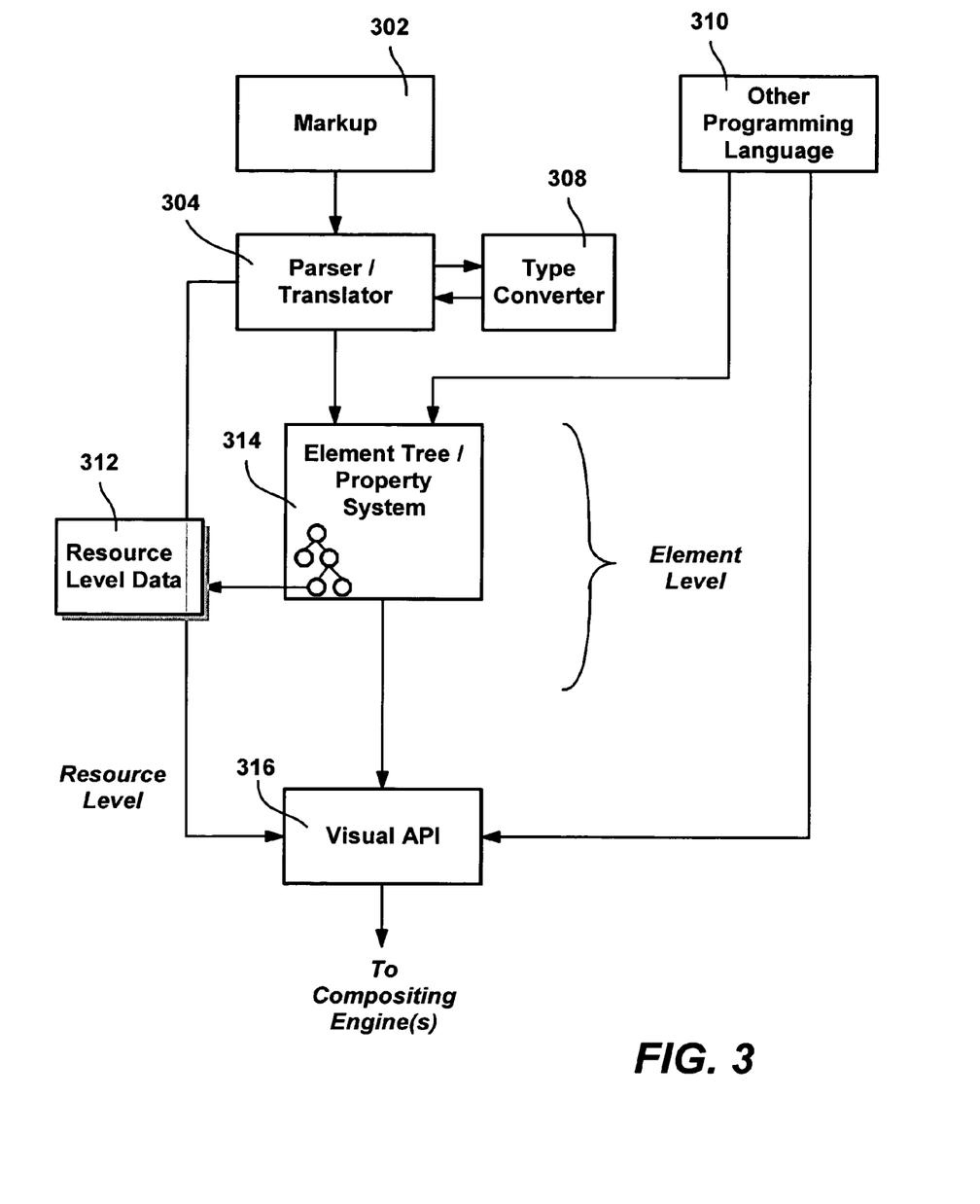
FIG. 3 is a representation of components for interpreting markup language code to interface with the visual API layer, in accordance with an embodiment.

FIG. 3 represents one implementation in which markup code 302 such as XAML-based code may be interpreted by a parser/translator 304. In general, the parser/translator 304 adds elements to the element tree/property system 314; the elements are visual objects that do their own layout. Further, note that some or all of the markup code may be compiled rather than interpreted on demand, thereby improving efficiency.

In general, an element is an object in the element layer that participates in the property system, triggering and layout/presentation system. The parser 304 finds tags and decides if those tags help to define an element or a resource object. In the special case of a VisualBrush, for example, the same tags may be interpreted as elements or also interpreted as resource objects, depending on the context of where those tags appear, e.g., depending on whether appearing in complex property syntax or not, as described in U.S. patent application Ser. No. 10/401,717.

In addition to being present inline in the markup, a resource instance may be located elsewhere (e.g., in the markup or in a file, which can be local or on a remote network and appropriately downloaded), and referenced by a name, (e.g., a text name, reference or other suitable identifier). In this manner, a scene designer can reuse an element in the element tree throughout a scene, including elements described by the complex property syntax.

The parser 304 handles markup in the complex property syntax by accessing the type converter 308 as necessary, and also by matching specified parameters to the object properties, thereby handling the complexity for the scene designer. Thus, the parser 304 does not just set up the objects, but also sets properties on the objects. Because the same rendering model is shared between the element level and the API level, many of the objects are essentially the same. This makes parsing/translation highly efficient, and also allows different types of programming languages (e.g., C#-like languages) the ability to easily convert from the markup to its own syntax, and vice-versa. Note that as represented in FIG. 3, another such programming language 310 (which may comprise compiled markup) can add elements to the element tree 314, or can directly interface with the visual API layer 316.

As also represented in FIG. 3, the same markup 302 may be used to program at an element level and a resource level. In general, the element level gives the scene designer full programmability, usage of the property system that provides inheritance (e.g., style-sheet like features), and triggering (e.g., whereby an element may have attached code to change its appearance, position and so forth in response to a user input event or action). However, various embodiments also provide a resource-level mechanism by which scene designers can essentially shortcut the element tree and program directly to the visual API layer. For many types of static shapes, images and the like where element-level features are not needed, this provides a more efficient and lightweight way to output the appropriate object.

For purposes of controlling animation and media output, a timing tree comprising clocks is also maintained. In general, the high-level compositor and animator engine 206 performs complex processing (sometimes referred to as compiling) that significantly simplifies the amount of processing and significantly reduces the amount of data that lower levels need to deal with to render the correct output. Note, however, that the amount and type of processing that is performed by the higher level may be dependent to a significant extent on the load, configuration and capabilities of the lower levels. For example, if high capability graphics hardware is present, the higher level may do a lesser amount of processing, and vice-versa. The high-level and low-level layers are adaptive to these factors.

In general, animation is accomplished by both the high-level compositor and animation engine 206 and the low-level compositor and animation engine 210. In one implementation, the high-level engine 206 traverses the scene and updates animation parameters with intervals for later interpolation, and packages these simplified data structures into instructions that get passed to the lower-level engine 210. This may be done in a synchronous and/or asynchronous manner. The interval data can be considered as including the timing endpoints (start and end timing data), as well as the parameterized values for the rendering instruction. Note that the high-level engine 204 can perform some or all of a requested interpolation, e.g., if an interpolation or other motion function is too complex for the lower-level engine 210 to handle, or the lower-level cannot keep up with the processing demands placed thereon, the higher-level engine can perform some or all of the calculations and provide the lower-level with simplified data, instructions, tessellations, and so on to accomplish the desired result.

In a typical case when the lower level does perform interpolations, for each frame of animation, the low-level engine 210 interpolates the parameter intervals to obtain instantaneous values, and decodes the instructions into rendering commands executed by the graphics device. The graphics device composes the final scene adding any video frames that might be present in the scene. Other data also may be added, such as content protected by digital rights management.

The high-level engine 206 thus traverses the scene data-structures, computes an interval describing each animated parameter for a period of time, and passes these intervals and simplified parameterized drawing instructions to the low-level engine 210. The parameter data includes start time, end time, interpolator and interpolation data. By way of example, instead of erasing and redrawing an image so that it appears to move, the high-level compositor and animation engine 206 can instruct the low-level compositor and animation engine 210 as to how the image should change over time, e.g., starting coordinates, ending coordinates, the amount of time (interval) that the image should move between the coordinates, and a motion function such as linear; (note that motion is not required for animation, as a stationary object may be animated by changing its color property, for example). The low-level compositor and animation engine 210 will interpolate to determine new positions between frames, convert these into drawing instructions that the graphics device can understand, and pass the commands to the graphics device. Each pass of the high-level engine 206 preferably provides sufficient data for the low-level engine 210 to perform smooth animation over several frames.

The low-level (e.g., fast-tick) engine 210 is a separate task from the high-level engine 206. The low-level engine 210 receives the simplified parameterized drawing instructions and parameter intervals describing the scene from the high-level engine 206. The low-level engine maintains and traverses these data structures until new ones are provided by the high-level engine 206. The low-level engine may service multiple high-level engines 206, maintaining separate data structures for each. The one-to-many relationship between the low-level engine 210 and high-level engine 206 allows the system to smoothly animate multiple scenes simultaneously.

The low-level engine 210 interpolates essentially instantaneous animation parameters based on the high-level engine's provided intervals, updates drawing instructions and renders the scene for every frame. The low-level engine 210 task runs at a high priority on the system, to ensure that frames are ready for presentation such as at the graphics hardware screen refresh rate. The interpolations performed by the low-level engine 210 are thus typically limited to simple, fast functions such as linear, piecewise linear, cubic spline and those of similar speed.

With respect to animation and media, a program such as the application program 202, specifies animation property values along with timing information, referred to as clocks or clock properties, to the high-level component 206. As described below, essentially any independent animation or media (e.g., linear media such as video and audio), as well as a storyboard that coordinates specified animations, will have a clock maintained for it at the high-level component. In general, the author specifies timeline data that is instantiated into the clocks as appropriate to keep them synchronized.

In general, animations and linear media are associated with a set of clocks which are related to each other by synchronization primitives and rules. The clocks may be hierarchically arranged, e.g., the application program has a parent clock, and animated objects of the application program are children, which in turn may have other children. When a property of a clock is defined or modified, any children of that clock are affected. For example, pausing a parent clock pauses any of its child clocks, and doubling the speed of a parent clock doubles the speed of any of its child clocks.

These clock properties may be modified by source events comprising interactive control events initiated by the application at run-time. Thus, the clocks are interactive, in that each clock can be individually started, paused, resumed and stopped at arbitrary times by the application, e.g., in response to user input. In addition, new clocks can be added to the timing structure, and existing clocks can be removed.

As described in aforementioned U.S. patent application Ser. No. 10/693,822, the high-level timing component may generate an interval list for each clock based on a stored list of events (begin, pause, and so forth) and the associated synchronization primitives. The activation intervals are straightforward, non-overlapping segments that describe the time expressed by a given clock at different points in real-world time.

Graphics Primitives

As used herein, graphics primitives are objects that support cloning, such as Freezables, (e.g., brush, transform, geometry and the like). Graphics primitives are used to set properties of visual elements such as FrameworkElement of the class hierarchy defined in the programming model for a version of the Windows® operating system developed by Microsoft Corporation, Redmond, Washington. For example, a brush is a Freezable that can set the background of a button or panel by cloning the original background information and then operating on the cloned information, such that the original information may be restored. Note that Freezable is a subclass of DependencyObject in the aforementioned class hierarchy (which is above FrameworkElement in the class hierarchy). An example element tree with visual element objects are described below.

Example Element Tree with Inheritance Context

Figure 4:
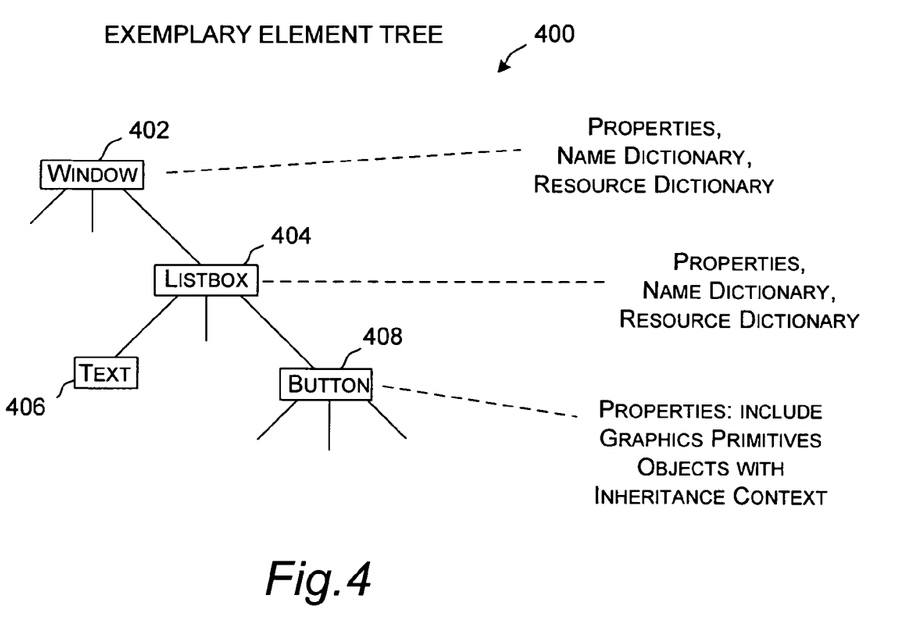
FIG. 4 is a representation of an example element tree used in displaying a visual element, in accordance with an embodiment.

FIG. 4 illustrates an example element tree 400 used in displaying a visual element, in accordance with an embodiment. In this example, element tree 400 includes a window 402, with a listbox 404 as a child, which in turn has as children a text object 406 and a button 408. Each of the nodes in element tree 400 can have properties, name dictionaries, and resource dictionaries. As previously mentioned, a child element can "walk" up the element tree to use the properties, name dictionaries and resource dictionaries of its parent elements.

Further, in this example, button 408 includes a graphics primitive for at least one of its properties. In accordance with this embodiment, the graphics primitives include inheritance context that provides a link between the graphic primitive (and its children, if any) and button 408. In one embodiment, the inheritance context is provided only for unshared graphics primitives. An example is described in conjunction with FIG. 5 below.

The inheritance context allows the graphic primitive to find button 408 (and its parent elements) and the properties, name dictionaries and resource dictionaries of button 408 and its parents (e.g., listbox 404 and window 402). In some scenarios, the graphic primitive can implement databinding with a data source such as, for example, a property or name dictionary. The inheritance context allows the databinding to work in both markup and code. Similarly, for a dynamic resource reference in a graphics primitive, the resource reference can be resolved because the inheritance context allows the graphics primitive to walk up the element tree to find the resource.

In contrast, in some conventional systems, a databinding on a graphics primitive would have to be done in code (e.g., the databinding is explicitly given a source) in order for the binding to work for inheritable properties and name dictionaries residing in the element tree. Further, the dynamic resource reference would not be able to resolve because there is no "mechanism" by which the graphics primitive will know which element to begin walking up to find the dynamic resource. Example 1 below illustrates this unworkable scenario.

```
<Window>
    <Window.Resources>
        <Color x:Key="Stop1">Red</Color>
        <Color x:Key="Stop2">Blue</Color>
    </Window.Resources>
    <Rectangle>
        <Rectangle.Fill>
```

-continued

```
            <LinearGradientBrush>
                <SolidColorBrush Color="{DynamicResource Stop1}"/>
                <SolidColorBrush Color="{DynamicResource Stop2}"/>
            </LinearGradientBrush>
        </Rectangle.Fill>
    </Rectangle>
    ...
</Window>
```

EXAMPLE 1

In Example 1, a Rectangle is to be filled using a graphics primitive object LinearGradientBrush. The "endpoint" colors of the LinearGradientBrush are SolidColorBrush objects that each references a dynamic resource for the colors. It is intended that the rectangle will be filled with a color that linearly varies from one color to another color; however, because the visual element are not parent of graphic primitives in conventional systems, the SolidColorBrush objects cannot find the dynamic resource library.

Figure 5:
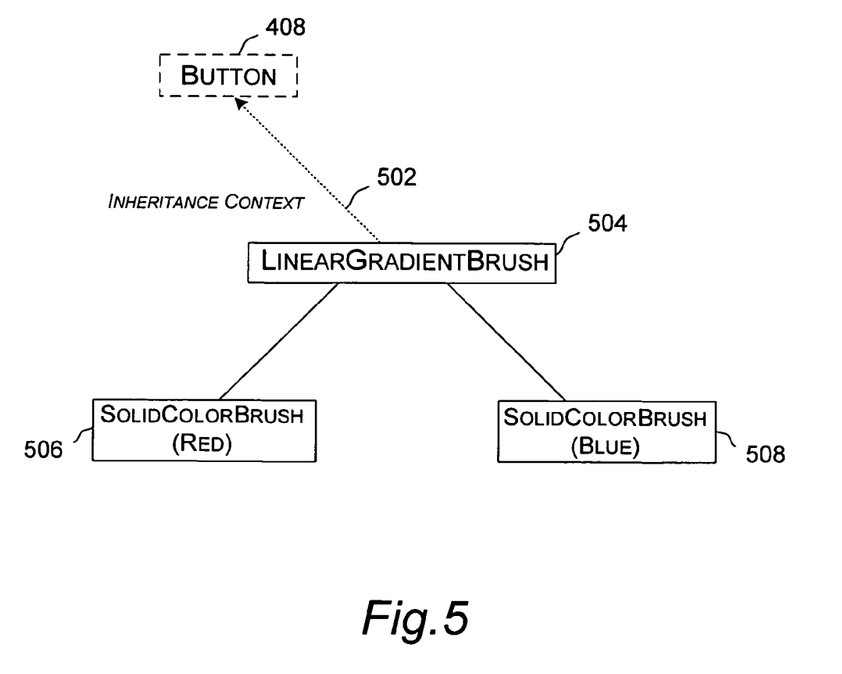
FIG. 5 is a representation of a graphics primitive tree, in accordance with an embodiment.

FIG. 5 illustrates an example graphics primitive tree 500 associated with a visual element, in accordance with an embodiment. In this example, graphics primitive tree 500 is associated with a button of an element tree such as button 408 of element tree 400 (FIG. 4). The inheritance context is indicated by a dashed arrow 502. In one embodiment, the inheritance context is implemented using a pointer to button 408.

In this example, button 408 has a property for the background color of the button, which is defined using a linearly graded brush 504 (i.e., a graphics primitive object). Linear gradient brush 504 in turn has properties defining the endpoint colors of the linear gradient brush. In this example, linear gradient brush 504 includes as properties a red solid color brush 506 and a blue solid color brush 508. Thus, when displayed, button 408 will have a background that ranges from blue at one end and linearly varies to red at the other end. The colors red and blue for solid color brushes 506 and 508 may be stored as a dynamic resource.

Returning to Example 1 above, in an embodiment using an element tree such as element tree 400 (FIG. 4) and an appropriate graphics primitive tree similar to graphics primitive tree 500, the markup of Example 1 would work in this embodiment because the inheritance context provides a way for the SolidColorBrush objects to walk up element tree to find the dynamic resource library. Example 2 below illustrates a part of a DependencyObject (of which graphics primitives are a subclass) that is useable to implement inheritance context.

```
...
// Get the context
internal virtual DependencyObject GetInheritanceContext( )
{
    return null;
}
// You have a new context
internal virtual bool OnNewContextAvailable (DependencyObject context)
{
}
// Something above GetInheritanceContext has changed
internal void OnInheritanceContextChanged( )
{
    // Fire the event that databinding/resources listen to
    InheritanceContextChanged( new EventArgs( ) );
```

-continued

```
    // Let subclasses respond too
    OnInheritanceContextChangedCore( );
    // Notify DPs of the new context
    LocalValueEnumerator enumerator = GetLocalValueEnumerator( );
    while (true)
    {
        DependencyObject doCurrent = enumerator.Current as
        DependencyObject;
        if (doCurrent != null)
        {
            // 'this's inheritance context changed, and doCurrent has
'this'
            // for its inheritance context, so it's got a new overall
context
            if (doCurrent.GetInheritanceContext( ) == this)
                doCurrent.OnInheritanceContextChanged( );
        }
    }
}
internal virtual void OnInheritanceContextChangedCore( )
{
}
// Event for OnInheritanceContextChanged
internal event EventHandler InheritanceContextChanged
{
    // Storing handlers in an uncommon field or EventHandlersStore.
    add { } remove { }
}
// By default, consider this object to be un-shared, since
// it doesn't even have one context.
internal virtual bool HasSharedContext( )
{
    return false;
}
...
```

EXAMPLE 2

As illustrated by Example 2,this embodiment of DependencyObject includes a virtual method to get the dependency context, and a method to indicate that the inheritance context has changed. This embodiment of DependencyObject can: (a) call a method to fire an event that can trigger actions in the listeners (e.g., databindings and dynamic resources); (b) call a method to let subclasses of DependencyObject (e.g., Visual, UIElement, FrameworkElement) respond to the inheritance context change; and (c) recursively call a method to notify its DependencyProperties (e.g., graphics primitives such as Freezables) so that all of the DependencyProperties are notified. Each instance of a DependencyObject subclass object (e.g., a Freezable object) can implement an event handler to handle the events that are fired when the inheritance context changes.

Example 3 below illustrates a part of a DependencyObject that sets the inheritance context for a graphics primitive object.

```
...
public void virtual SetValue( DependencyProperty dp, Object value )
{
    ...
    // If there's an existing value, this DO is no longer its context
    object current = ReadLocalValueInternalRaw(dp,metadata);
    DependencyObject doCurrent = current as DependencyObject;
    if (doCurrent!= null && doCurrent.GetInheritanceContext( ) == this)
        doCurrent.OnNewContextAvailable (null);
    ...
    // Become the context of the new value. This occurs after
    // invalidation, so that FE has a chance to hook up the
```

-continued

```
    // logical tree first.
    DependencyObject do = value as DependencyObject;
    if (do!= null)
        do.OnNewContextAvailable (this);
    ...
}
...
public void virtual ClearValue( DependencyProperty dp )
{
    ...
    DependencyObject do = value as DependencyObject;
    if (do!= null && do.GetInheritenceContext( ) == this)
        do.OnNewContextAvailable (null);
    ...
}
...
```

EXAMPLE 3

As illustrated by Example 3,this embodiment of DependencyObject includes a method to set the inheritance context of a DependencyProperty (e.g., a graphics primitive object). If the method is called, the DependencyObject instance provides itself as the inheritance context for the DependencyProperty. For example, a button (i.e., a DependencyObject) will provide a pointer to itself to a SolidColorBrush (i.e., a DependencyProperty of the button) to serve as the inheritance context. Further, as illustrated in Example 3,this embodiment of DependencyObject includes a method to clear the inheritance context of a DependencyProperty.

The following example (Example 4) illustrates how a graphics primitive object supports inheritance context in one embodiment.

```
...
private bool __isShared = false;
private DependencyObject __context;
internal override DependencyObject GetInheritanceContext( )
{
    return __context;
}
internal override bool HasSharedContext( )
{
    return __isShared;
}
internal override bool OnNewContextAvailable
(DependencyObject context)
{
    if (__isShared)
        // Graphics primitive is already shared, don't need to know the
context
        return false;
    else if (__context != null)
    {
        // Now being shared, clear the context
        __isShared = true;
        __context = null;
        OnInheritenceContextChanged( );
        return false;
    }
    else
    {
        // Pick up the new context
        __context = context;
        OnInheritenceContextChanged( );
        return true;
    }
}
```

EXAMPLE 4

In this embodiment, when the inheritance context changes, the Dependency Object already walks all Dependency Properties (see Example 2 above). Thus, in this embodiment, the graphics primitive object does not need to include anything more to have the OnInheritanceContextChanged percolate down the graphics primitive tree.

Example Inheritance Context for a Visual Element Although inheritance context is described above for graphics primitives, in some embodiments a visual element can also specify an inheritance context (i.e., other than the normal inheritance from a parent visual element). In one embodiment, a visual element can give precedence to normal parent inheritance, and thus will only have an inheritance context when it is not in a visual tree. An Example 5 below illustrates how to determine if a visual element has an inheritance context.

```
...
// Sparse storage for the pointer to the parent visual element (e.g., a
VisualBrush)
private static readonly UncommonField<DependencyObject>
      InheritanceContextField = new
      UncommonField<DependencyObject>( );
private DependencyObject InheritanceContext
{
      get { return InheritanceContextField.GetValue(this); }
      set { InheritanceContextField.SetValue( this, value ); }
}
// Abstract the "parent". This is the Visual parent here.
internal virtual DependencyObject ParentForInheritanceContext
{
      get { return _parent };
}
// Get the inheritance context
internal override DependencyObject GetInheritanceContext( )
{
      // If this has a visual parent, that is the context
      if (ParentForInheritanceContext != null)
         return ParentForInheritanceContext;
      // Otherwise, determine if there is an inheritance context (i.e., likely
      // a VisualBrush).
      else if (InheritanceContext != null)
         return InheritanceContext;
      // otherwise, this has no context at all.
      else
         return null;
}
...
```

EXAMPLE 5

As illustrated in Example 5, a method GetInheritanceContext returns the parent inheritance unless the visual element does not have a parent inheritance. If there is no parent inheritance, then the method provides the inheritance context, if there is one.

Example 6 below illustrates how a visual element obtains an inheritance context. As described above for graphics primitive objects, the visual element may be used by multiple other visual elements. In accordance with this embodiment, the inheritance context feature is blocked or ignored in a visual element if multiple other visual elements are using this visual element. If other visual elements are not using this visual element, then the inheritance context can be obtained if the visual element does not have a parent.

```
...
// If this bit is set, multiple DOs have tried to put this in their context
// (e.g., this visual element is referenced by multiple other visual
elements).
private bool _hasMultipleDOContext;
// Receive a new potential inheritance context
internal override void OnNewContextAvailable
(DependencyObject context)
{
      // If this visual element in the context of multiple DOs already, then
      // don't use this new context.
      if (_hasMultipleDOContext)
         return;
      // If there is already a Dependcy Object (DO) context, then stop
      // tracking any DO context. This is similar to the shared
      // state in Freezable.
      else if (InheritanceContext != null)
      {
         // Already had a DO context, so clear it, and
         // go into a semi-shared state.
         InheritanceContext = null;
         _hasMultipleDOContext = true;
         // If there is a visual parent, then InheritanceContext is
         // being ignored. But if we don't have
         // a visual parent, then the context is being changed
         // (to no context), so need to do a notify.
         if (ParentForInheritanceContext == null)
         {
            OnInheritenceContextChanged( );
         }
      }
      // Otherwise, there is no InheritanceContext set already,
      // so take this one.
      else
      {
         InheritanceContext = context;
         // Again, if there is a visual parent, then the InheritanceContext is
         // being ignored anyway. But if no visual parent, then
         // context has been changed, and have to do a notify.
         if (ParentForInheritanceContext == null)
         {
            OnInheritenceContextChanged( );
         }
      }
}
...
```

EXAMPLE 6

Example 7 below illustrates how to determine whether a visual element is being used by multiple other visual elements. In this embodiment, the visual element has a method HasSharedContext( ) that can be called to determine whether that visual element is being used by multiple other visual elements.

```
internal override bool HasSharedContext( )
{
      if (ParentForInheritanceContext != null)
         return false;
      else if (_hasMultipleDOContext)
         return true;
      else
         return false;
}
...
```

EXAMPLE 7

When a visual element gets a new context, it needs to notify its children of the context change. Example 8 below illustrates how in one embodiment the visual element recursively notifies each of its children.

```
...
protected internal virtual void OnVisualParentChanged(Visual oldParent)
{
    OnInheritanceContextChanged( );
}
internal override void OnInheritanceContextChangedCore( )
{
    base.OnInheritanceContextChangedCore( );
    foreach (Visual child in Children)
        child.OnInheritanceContextChanged( );
}
...
```

EXAMPLE 8

Figure 6:
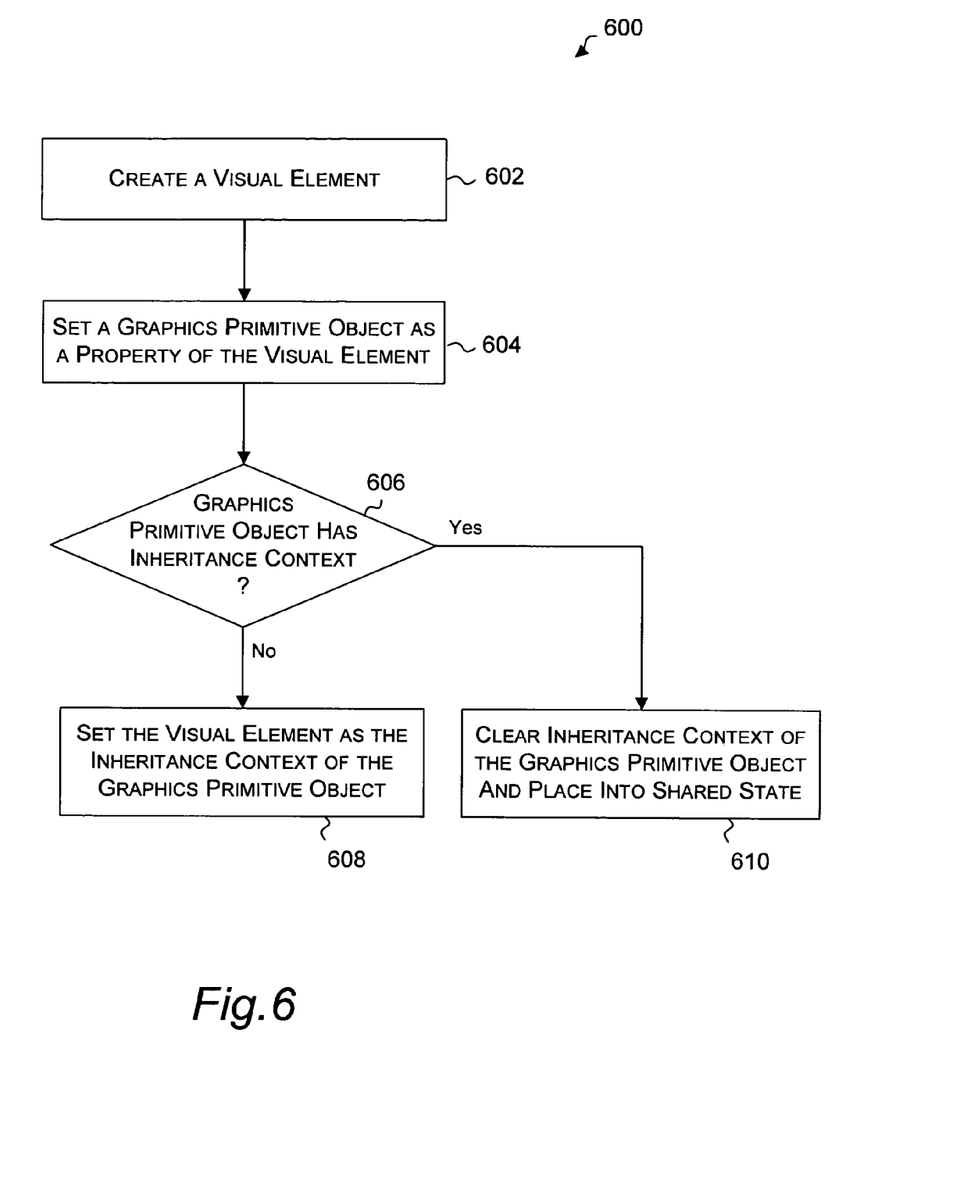
FIG. 6 is a representation of an operational flow in creating a graphics primitive with inheritance context, in accordance with an embodiment.

FIG. 6 illustrates an operational flow 600 in creating a graphics primitive object with inheritance context, in accordance with an embodiment. Operational flow 600 may be performed in any suitable computing environment. For example, operational flow 600 may be executed by a system such as the media integration layer architecture 200 (FIG. 2). Therefore, the description of operational flow 600 may refer to at least one of the components of FIG. 2. However, any such reference to components of FIG. 2 is for descriptive purposes only, and it is to be understood that the implementations of FIG. 2 are a non-limiting environment for operational flow 600.

At a block 602, a visual element is created. In one embodiment, a composition and animation engine such as high-level composition and animation engine 206 (FIG. 2) builds an element tree structure (including the aforementioned visual element). For example, this visual element can be an element such as a button, text, rectangle, etc.

At a block 604, a graphics primitive object is set as a property of the visual element. In one embodiment, the aforementioned composition and animation engine can create the graphics primitive object. For example, this graphic primitive object can be a single object such as a brush, or a tree of graphics primitive objects, such as a linear gradient brush with two children solid color brushes to define the range of colors of the linear gradient brush.

At a block 606, it is determined whether the graphics primitive object already has an inheritance context. For example, in some scenarios, two visual elements may use the same graphics primitive; however, this embodiment does not support inheritance context for two visual elements using the same graphics primitive (i.e., the graphics primitive object is "shared" by two or more visual elements). In one embodiment, the aforementioned composition and animation engine can determine whether the graphics primitive object has an inheritance context. If the graphics primitive object does not have an inheritance context, operational flow can proceed to a block 608. If the graphics primitive object already has an inheritance context, operational flow can proceed to a block 610.

At block 608, the visual element created at block 602 is set as the inheritance context of the graphics primitive object created at block 604. In one embodiment, the aforementioned composition and animation engine can set the visual element as the inheritance context of the graphics primitive object. For example, the composition and animation engine can provide to the graphics primitive object an "up" pointer that points to the visual element. Once the inheritance context is set, the graphics primitive object can advantageously use databindings, name dictionaries, and/or resource dictionaries that are part of the element tree containing the visual element.

At block 610, the inheritance context for the graphics primitive object is ignored or blocked. In some embodiments, the graphics primitive object may have a property that indicates whether the graphics primitive object is being shared. For example, such a property may be a Boolean property that is set when the graphics primitive object is shared. When set, the inheritance context can be cleared or ignored. In one embodiment, the aforementioned composition and animation engine can block or clear the inheritance context of the graphics primitive object and then place the graphics primitive object into a shared state (e.g., by setting the aforementioned Boolean property).

Although operational flow 600 is illustrated and described sequentially in a particular order, in other embodiments, the operations described in the blocks may be performed in different orders, multiple times, and/or in parallel. Further, one or more operations described in the blocks may be omitted or combined in some embodiments.

Further, in some embodiments, operational flow 600 can also include operations (not shown) to detect or recognize if a graphics primitive object that was shared becomes unshared. For example, a reference count or other mechanism may be maintained (e.g., by the aforementioned composition and animation engine) to detect when a once-shared graphics primitive object becomes unshared. The inheritance context of the visual element that still uses the graphics primitive can then be reset (e.g., by performing block 608) or "reinstated".

Figure 7:
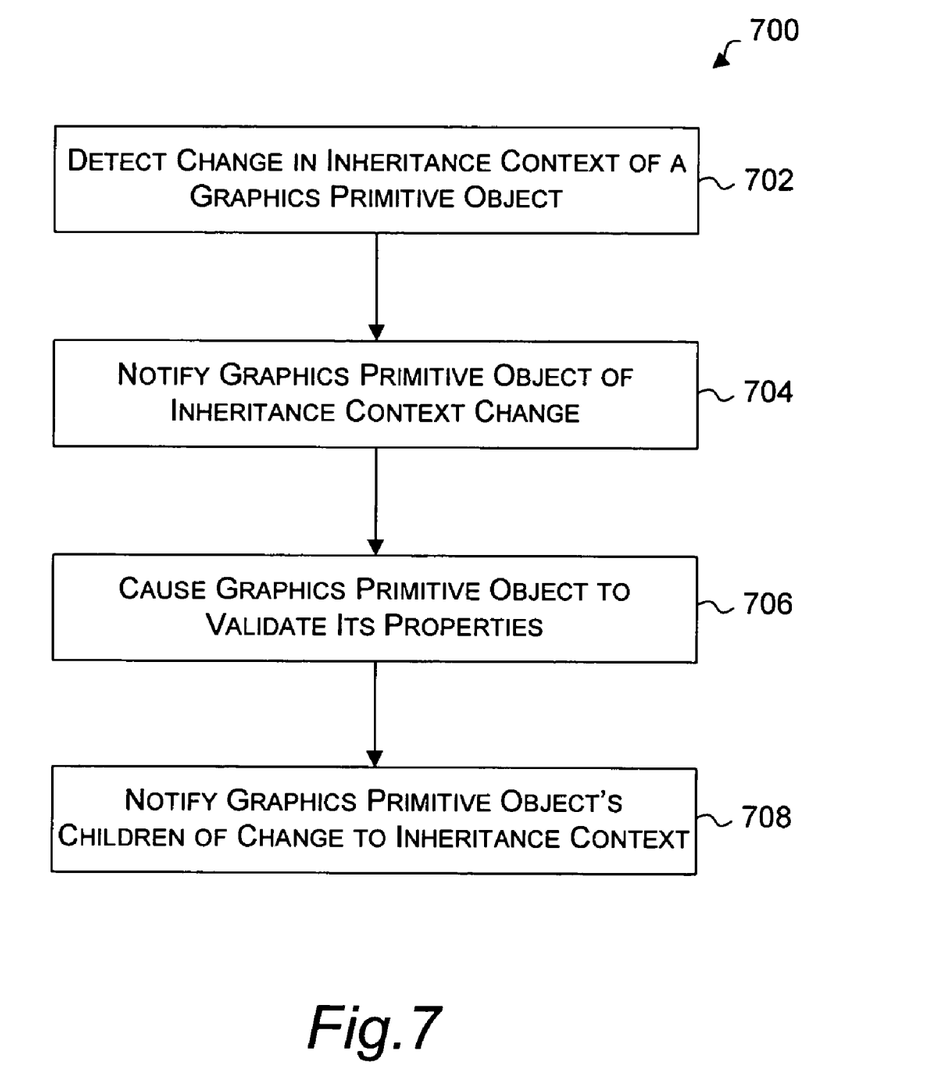
FIG. 7 is a representation of an operational flow in changing the inheritance context of a graphics primitive, in accordance with an embodiment.

FIG. 7 illustrates an operational flow 700 in responding to a change in heritance context for a graphics primitive object, in accordance with an embodiment. Operational flow 700 may be performed in any suitable computing environment. For example, operational flow 700 may be executed by a system such as the media integration layer architecture 200 (FIG. 2). Therefore, the description of operational flow 700 may refer to at least one of the components of FIG. 2. However, any such reference to components of FIG. 2 is for descriptive purposes only, and it is to be understood that the implementations of FIG. 2 are a non-limiting environment for operational flow 700.

At a block 702, an inheritance context change is detected by a graphics primitive object. For example, there may have been a change to an inheritable property (or a dynamic resource dictionary, a name dictionary, etc.) associated with a higher element of the element tree containing the visual element for which the graphic primitive object is a property. In one embodiment, when such a change occurs, a method of the graphics primitive object may be called when such a change occurs. For example, in the embodiment of Example 2, operation that causes the change also calls the method OnInheritanceContextChanged on the graphics primitive object.

At a block 704, resources and/or databindings used by the graphics primitive object are notified of the inheritance context change. In one embodiment, the graphics primitive object can fire an event that notifies listeners (i.e., the resources and/or databindings) of the inheritance context change. For example, in the embodiment of Example 2, a method InheritanceContextChanged(new EventArgs( )) is called to fire the event.

At a block 706, the graphics primitive object then validates itself using the inheritance context. In one embodiment, the graphics primitive object attempts to find values of all of its properties. For values specified by a databinding, name dictionary or resource dictionary, the graphics primitive object can walk up the element tree starting at the visual element for which the graphics primitive object is a property. For example, in the embodiment of Example 2, the graphics primitive element calls a method OnInheritance ContextChangedCore( ) is called to validate its properties.

At a block 708, any children of the graphics primitive object are notified of the inheritance context change. In one embodiment, the graphics primitive object can walk down its tree of graphics primitive objects (if it has children), and notify each child graphics primitive object that the inheritance context has changed. Further, when notified of this inheritance context change, if unshared, the child can then validate itself as in block 706. For example, in the embodiment of Example 2, as the graphics primitive object walks down to each of its children (if any), for child it finds it calls the aforementioned method OnInheritanceContextChangedCore( ).

Operational flow 700 allows a graphics primitive object to detect changes in its inheritance context and validate itself and all of its children.

Although operational flow 700 is illustrated and described sequentially in a particular order, in other embodiments, the operations described in the blocks may be performed in different orders, multiple times, and/or in parallel. Further, one or more operations described in the blocks may be omitted or combined in some embodiments.

Reference has been made throughout this specification to "one embodiment," "an embodiment," or "an example embodiment" meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems disclosed herein without departing from the scope of the claimed invention.

What is claimed is:

1. A computer-implemented method for creating an inheritance context for a graphics primitive, the method comprising:
   creating a visual element;
   creating a graphics primitive object as a property of the visual element; wherein the visual element is implemented using the graphics primitive object; and
   setting the visual element as the inheritance context of the graphics primitive object such that the graphics primitive object can access the visual element and any parent of the visual element.

2. The method of claim 1 wherein setting the visual element as the inheritance context comprises providing to the graphics primitive object a pointer that points to the visual element.

3. The method of claim 1 wherein the inheritance context is used to make element information available to the graphics primitive object.

4. The method of claim 3 wherein at least some of the element information is included in a name dictionary of an element in an element tree containing the visual element.

5. The method of claim 3 wherein at least some of the element information is included in a resource dictionary of an element in an element tree containing the visual element.

6. The method of claim 3 wherein at least some of the element information is an inheritable property of an element in an element tree containing the visual element.

7. The method of claim 1 wherein the graphics primitive object is not shared with another visual element.

8. One or more computer-readable storage media having stored thereon instructions that when executed by a computer implement the method of claim 1.

9. A system for creating an inheritance context for a graphics primitive, the system comprising:
   a property system to store an element tree and values for properties of visual elements of the element tree;
   a graphics subsystem to provide data used to display the visual elements via a display device; and
   a component to create a visual element having a graphics primitive object as a property, wherein the visual element is implemented using the graphics primitive object, wherein the visual element is set as the inheritance context of the graphics primitive object.

10. The system of claim 9 wherein the inheritance context comprises a pointer that points to the visual element.

11. The system of claim 9 wherein the inheritance context is used to make element information available to the graphics primitive object.

12. The system of claim 11 wherein at least some of the element information is included in a name dictionary of an element in the element tree containing the visual element.

13. The system of claim 11 wherein at least some of the element information is included in a resource dictionary of an element in the element tree containing the visual element.

14. The system of claim 11 at least some of the element information is an inheritable property of an element in the element tree containing the visual element.

15. One or more computer-readable storage media having stored thereon instructions that when executed by a computer implement the system of claim 9.

16. A computer-implemented method for creating an inheritance context for a graphics primitive, the method comprising:
   creating a first visual element;
   creating a second visual element as a property of the first visual element; wherein the first visual element is implemented using the second visual element; and
   setting the first visual element as the inheritance context of the second visual element.

17. The method of claim 16 wherein setting the first visual element as the inheritance context comprises providing to the second visual element a pointer that points to the first visual element.

18. The method of claim 16 wherein the inheritance context is used to make element information available to the second visual element.

19. The method of claim 18 wherein at least some of the element information is included in a name dictionary of an element in an element tree containing the first visual element.

20. The method of claim 18 wherein at least some of the element information is included in a resource dictionary of an element in an element tree containing the first visual element.

* * * * *